United States Patent [19]

Dinger

[11] 4,283,667
[45] Aug. 11, 1981

[54] MOTOR FIELD EXCITER

[75] Inventor: Edward H. Dinger, Waynesboro, Va.

[73] Assignee: General Electric Company, Salem, Va.

[21] Appl. No.: 66,591

[22] Filed: Aug. 14, 1979

[51] Int. Cl.³ .............................................. H02P 5/16
[52] U.S. Cl. ...................................... 318/356; 318/532
[58] Field of Search ............... 318/356, 532, 533, 376, 318/370, 379, 380

[56] References Cited

U.S. PATENT DOCUMENTS

| | | | |
|---|---|---|---|
| 3,675,105 | 7/1972 | Petigalla | 318/356 |
| 3,696,288 | 10/1972 | Carman | 323/21 |
| 4,027,220 | 5/1977 | Wilckerson | 318/376 |
| 4,074,175 | 2/1978 | Born et al. | 318/332 |
| 4,096,423 | 6/1978 | Bailey et al. | 318/376 |
| 4,191,914 | 3/1980 | Lecluse | 318/338 |

Primary Examiner—David Smith, Jr.
Attorney, Agent, or Firm—Arnold E. Renner

[57] ABSTRACT

Disclosed is an exciter circuit for an electrical load such as the field winding of a direct current (DC) motor. The exciter circuit regulates the DC current applied to the load from an alternating current (AC) source in response to an isolated feedback signal developed by means of a saturating square loop current transformer. The current signal developed is compared against a signal corresponding to the desired current value and an error signal is generated which is fed to photo-optical firing circuit means which are coupled to and operative to control at least one thyristor (SCR) which, when rendered conductive, is adapted to provide a freewheeling current path for the load current during the half cycle of the AC line voltage when it is disconnected from the load by at least a half wave rectifier. The present invention includes embodiments for both single and bidirectional current flow through the load which, as noted above, preferably comprises the field winding of a DC motor.

14 Claims, 10 Drawing Figures

MOTOR FIELD EXCITER

CROSS REFERENCE TO RELATED APPLICATION

The subject invention is related to U.S. application Ser. No. 066,590 entitled "Electronic-Magnetic Current Isolator Circuit", filed on even date herewith in the name of the present inventor, which application is also assigned to the assignee of this invention.

BACKGROUND OF THE INVENTION

This invention relates generally to current regulator circuitry and more particularly to a regulated exciter for supplying current to an inductive load such as the field winding of an electrical rotating machine.

Controlled field current exciters which are regulated through the control of the firing angle of a controlled rectifier circuit are well known. One example of such apparatus is disclosed in U.S. Pat. No. 3,564,391, "Rotating Alternating Current Generator System", issued to E. H. Dinger on Feb. 16, 1971. In this patent, a field winding of an alternating current (AC) generator, which is used as the exciter for another AC generator, is self-excited through at least one controlled rectifier unit which supplies direct current (DC) to the exciter field at a level determined by its firing angle or phase angle. Control of the exciter field current and thus indirectly of the generator output voltage is achieved by regulating the rectifier unit firing angle. Control of the firing angles of the rectifiers in the rectifier unit is achieved through control of the reset voltage applied to magnetic cores in each rectifier circuit. Thus while this patent discloses a regulated exciter for supplying the field current of an AC generator, the same principles apply to exciters for the fields of DC machines, since in both cases DC currents are supplied to the respective field windings.

SUMMARY OF THE INVENTION

It is therefore an object of the present invention to provide improved means for supplying regulated power to a load.

Another object of the present invention is to provide an improved circuit arrangement for supplying a regulated output current to an inductive load.

It is a further object of the present invention to provide an improved exciter for supplying current to an electric motor.

Yet another object of the present invention is to provide an improved exciter for supplying regulated field current to a DC motor.

These and other objects are accomplished through a power circuit including rectifying means coupling unidirectional or DC power current from an AC source to a load across which is connected a thyristor type switch which is adapted to be rendered conductive in response to a control signal applied thereto from a control circuit to provide a recirculating current path for current flow in the load. The load in its preferred form comprises the field winding of a DC motor and thus the recirculating path provides a freewheeling current path for field current during one half of the AC power cycle during which power current is not being applied from the AC source. The control signal is generated in accordance with the difference signal provided between a load current feedback signal and a current reference signal. The feedback signal is developed by means of a transducer consisting of a saturable core transformer coupled to the load. The transformer is additionally operative to provide circuit isolation between the power circuit and the control circuit. Suitable isolation means such as a photo-optic coupler means is connected between the thyristor switch and the control circuit for applying an isolated control signal to the thyristor switch. Both non-reversing and reversing field excitation circuit embodiments are provided.

BRIEF DESCRIPTION OF THE DRAWINGS

While the present invention is particularly defined in the claims annexed to and forming a part of the specification, a better understanding can be had from the following description taken in conjunction with the accompanying drawings in which:

DETAILED DESCRIPTION

Figure 1:
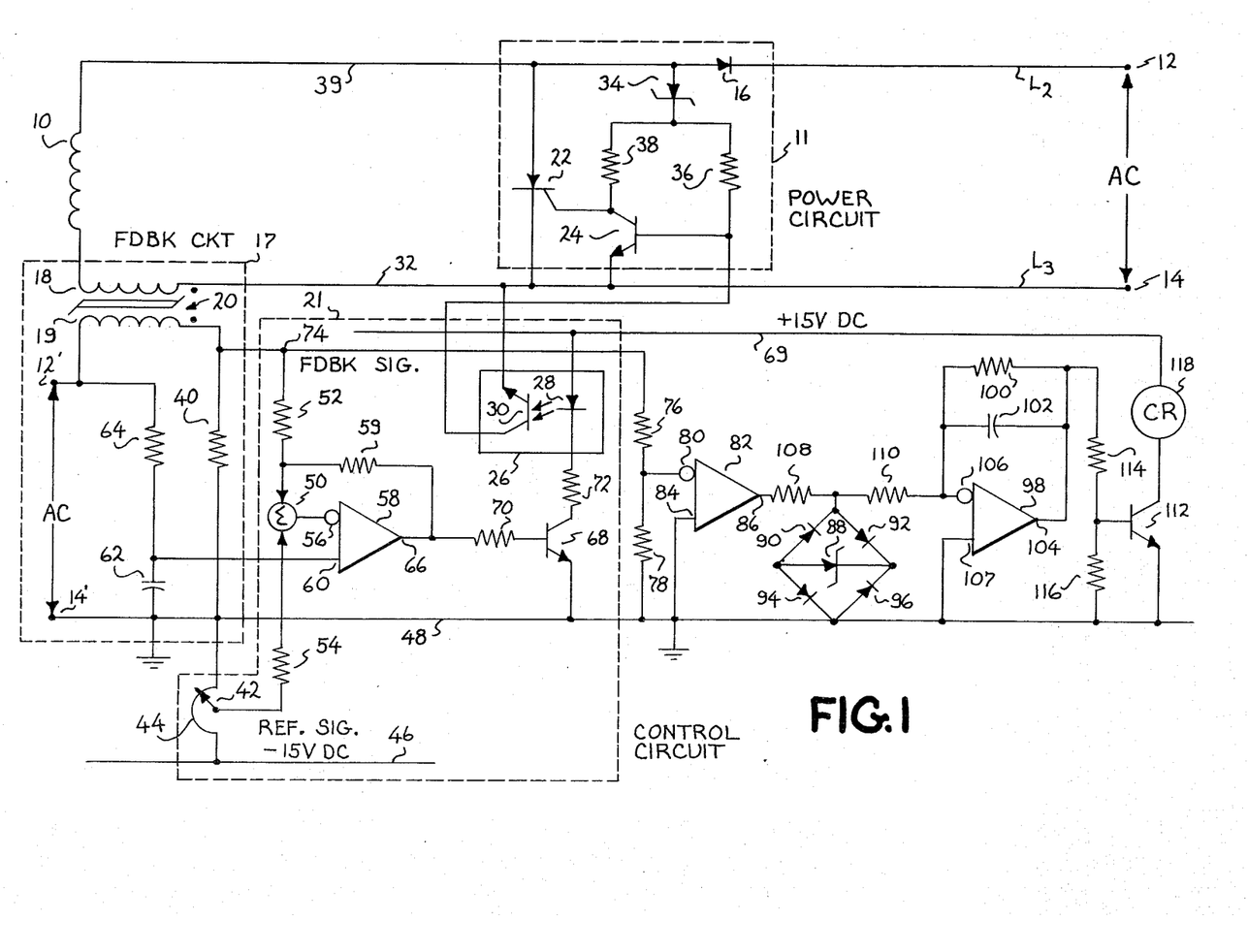
FIG. 1 is an electrical schematic diagram illustrative of a relatively simple half wave non-reversing type of field exciter according to the present invention.

Referring now to the drawings wherein like reference numerals refer to like circuit components throughout, reference is first made to the embodiment shown in FIG. 1. Disclosed therein is a single phase half-wave non-reversing or single direction current source in the form of an exciter circuit for the field winding of a DC motor. The field winding in FIG. 1 is illustrated as a load 10 being energized from a single phase alternating current line source voltage, not shown, through a power circuit 11 coupled to terminals 12 and 14. Current is coupled to the load, hereinafter referred to as the field winding 10, during one half cycle of the AC supply potential. This is effected by means of a half-wave rectifier comprising the semiconductor diode 16 connected between one end of the field winding 10 and terminal 12. The other side of the field winding 10 is coupled to terminal 14 through the primary winding 18 of a saturable core transformer 20 contained in a feedback circuit 17 which is adapted to provide an isolated feedback signal of the field current to a control circuit 21.

During the half cycle of the AC potential, that terminal 12 is negative with respect to terminal 14, the diode 16 is conductive to permit line current flow through the series connected field winding 10 and the primary winding 18. On the next half cycle diode 16 is back biased and the AC source can no longer feed current to the field winding; however, due to electrical inertia or flywheel effect of the inductance of the field winding 10, the current will tend to continue to flow and thus energy will be returned to the source. It can be seen, therefore, that in the absence of anything else the current in the field winding will assume a small predetermined average value. In order to provide an increase and furthermore a controlled increase of current through the field winding 10, a thyristor in the form of a silicon controlled rectifier (SCR) 22 is coupled across the field winding 10 and primary winding 18 on the load side of the rectifier diode 16 in order to provide a circulating or freewheeling current path. Normally, in the past, a diode rather than an SCR provided the circulating path. Control of the conductive state of the SCR 22 is provided by means of a transistor 24 which is coupled to a suitable isolating means such as a photo-optic coupler device or simply photocoupler 26 consisting of a light emitting diode 28 and a photo-transistor 30. When desirable, other forms of isolation such as pulse transformers could also be used. The emitters of both transistors 24 and 30 are connected to a circuit lead 32 connecting terminal 14 to the primary winding 18. The collector of transistor 30 is connected to the base of transistor 24 and the collector of transistor 24 is connected to the gate electrode of SCR 22. Additionally, the base and collector of transistor 24 are connected to the cathode of a Zener diode 34 by way, respectively, of fixed resistors 36 and 38. The anode of Zener diode 34, in turn, is connected to circuit lead 39 which connects one end of winding 10 to the anode of rectifier diode 16.

In operation, radiation from light emitting diode 28, when it is energized, falls on the photo-transistor 30, causing it to conduct. This action diverts base current from normally conducting transistor 24 causing it to turn off and thus divert the current it had been carrying to the gate of SCR 22, causing it to turn on. Thus the photocoupler 26 provides an isolated firing signal from a control circuit to the SCR 22 in the power circuit.

The control circuit 21 determines the point in the AC line voltage half cycle at which SCR 22 is turned on. It is responsive to two signals, a feedback signal proportional to the instantaneous DC field current during the time a decision is to be made to fire SCR 22, and a desired field current reference signal. The feedback signal is developed across a fixed resistor 40 (in feedback circuit 17) in a manner to be described, while the reference signal is taken from the slider element 42 of a controller type potentiometer 44 connected to a fixed DC potential (e.g. $-15$ V DC) applied to a supply bus 46. The other side of the potentiometer 44 is connected to circuit bus 48 which is shown connected to a point of reference potential illustrated as ground. The current feedback signal and the reference signal are coupled to a summing junction 50 by means of fixed resistors 52 and 54, respectively. The summing junction output is connected to the inverting input 56 of an operational amplifier 58 while the non-inverting input 60 receives an AC voltage which is shifted 90° relative to the AC line voltage applied across terminals 12 and 14. This 90° shifted voltage is developed across a capacitor 62 of an RC circuit which further includes a fixed resistor 64. This RC circuit is coupled across terminals 12' and 14' which are adapted to receive an in-phase AC voltage of lesser amplitude than the AC voltage applied across terminals 12 and 14. As is well known, the voltage taken across a capacitor of an RC circuit having an AC voltage applied thereacross is shifted in phase by 90° relative to the voltage appearing across the resistance.

At some point in the half cycle of the line voltage appearing across terminals 12 and 14, when terminal 12 is positive with respect to terminal 14 and the rectifier diode 16 is non-conductive, the output 66 of amplifier 58 will go positive. This point is determined by the difference signal between the feedback signal and the reference signal which appears at the output of summing junction 50. The output 66 of the operational amplifier 58 is coupled to the base of transistor 68 by means of resistor 70 and becomes conductive in response to a positive signal at the output 66. The collector of transistor 68 is coupled to the positive supply potential ($+15$ V) applied to circuit bus 69 through the fixed resistor 72 and the photo-diode 28 of the photocoupler 26. Conduction of transistor 68 effects conduction of the photodiode 28 which in turn energizes transistor 30 to cause transistor 24 in the power circuit 11 to turn off, at which time SCR 22 fires. Thus the point at which SCR 22 is turned on is determined by the sum of the two signals applied to the summing junction 50.

Turning attention now to the manner in which the load or field current feedback signal is generated, the saturable core transformer 20 is utilized for this purpose. As shown in FIG. 1, the saturable core transformer 20 includes a primary winding 18 which is coupled in series with the field winding 10. A secondary winding 19 of transformer 20 has one end connected to AC terminal 12', while its opposite end is connected to the resistor 40. The other side of resistor 40 is connected to circuit lead 48 which is common to AC terminal 14' and ground. The polarity dots indicate the ends of the windings having mutually like polarity. The end of the primary winding 18 having the polarity dot is connected to AC terminal 14 whereas the end of the secondary winding 19 having the polarity dot is connected to resistor 40. The core of the transformer 10 is fabricated from square-loop magnetic material. Because of the relatively high inductance of the field winding 10, the field current will be substantially the same from cycle to cycle so that for purposes of illustration the field current can be thought of as a constant current source. Accordingly, primary winding 18 of the transformer is designed such that the current necessary to saturate the transformer core is relatively small in comparison with the field current, so that the field current supplied via the power circuit 11 drives the transformer 20 far into saturation. Additionally, the transformer secondary to primary turns ratio is made relatively high so as to reduce the secondary currents to levels sufficiently low to minimize power dissipation in the secondary circuit.

In operation, during the half cycle of the AC line voltage when terminal 12 is negative with respect to terminal 14, field current flows into the dotted end of primary winding 18 and drives the core of the transformer 20 deep into saturation in one direction. During the next half cycle when terminal 14 is negative with respect to terminal 12, the positive voltage at terminal 12' will cause current to flow into the undotted end of the secondary winding 19 to cause the transformer to come out of saturation. When the secondary current reaches a value corresponding to the field current entering the dotted end of the secondary winding 19, a voltage drop will appear across resistor 40 proportional to the primary current and thus provide a feedback signal indicative of the instantaneous field current.

Excess voltage applied to the secondary winding 19 from the source applied across AC terminals 12' and 14' will appear across the secondary winding 19 as it begins to come out of saturation. The number of turns of the secondary winding, however, are selected such that in conjunction with the induced voltage from the primary winding 18, the transformer will not be driven into saturation in the opposite direction during the course of that half cycle. Thus, an isolated circuit arrangement is provided for developing a field current feedback signal which is applied to the summing junction 50 along with the reference voltage from the potentiometer 44. As a result of this summation, the magnitude of the field current becomes adjustable in accordance with the setting of the wiper element 42 of the potentiometer 44 inasmuch as it, along with the feedback signal, determines the point at which the SCR 22 is triggered into conduction during the half cycle of the AC line voltage in which the half wave rectifier diode 16 in non-conductive.

While the feedback circuitry 17 shown in FIG. 1 is illustrative of one means of determining the magnitude of the field current, it should be pointed out that this type of circuitry is merely illustrative of one typical means for developing a signal proportional to but electrically isolated from the current flowing in a power circuit. Another version is disclosed in the cross referenced related application, Ser. No. 066,590, entitled "Electronic-Magnetic Current Isolator Circuit" referred to above.

Ancillary to the embodiment of the invention considered thus far, FIG. 1 additionally discloses a field loss circuit since it is desirable to detect the loss of field current and remove armature voltage from the machine with which the field winding 10 is associated. Inasmuch as the voltage across resistor 40 provides a signal which is proportional to the field current, the signal at circuit junction 74 is coupled via a voltage divider consisting of resistors 76 and 78 to the inverting input 80 of an operational amplifier 82 whose noninverting input 84 is connected to the common circuit bus 48. The operational amplifier 82 is utilized as a comparator and the voltage at the output 86 is clamped at a constant amplitude for both positive and negative polarity outputs by a network consisting of Zener diode 88 and diodes 90, 92, 94 and 96.

The duration of the negative output voltage from the operational amplifier 82 will be proportional to the length of time that the voltage across resistor 40 is positive and the duration of the positive output voltage will be proportional to the length of time that the voltage across resistor 40 is negative. When field current is flowing, the voltage across resistor 40 is positive for a longer period for a cycle than the time that it is negative. When no field current is flowing, the times will be equal. Thus a means is available to determine whether field current is or is not flowing. If field current is flowing, the negative and positive output voltage times at the output 86 are unbalanced. This condition is utilized by coupling an integrating circuit to the clamped output of operational amplifier 82.

Accordingly, an operational amplifier 98, having a feedback resistor 100 and an integrator capacitor 102 coupled between an output 104 and an inverting input 106, is coupled to the output of operational amplifier 82 by means of series connected resistors 108 and 110. When field current is flowing, the negative and positive output voltage times at the output 86 of operational amplifier 82 are unbalanced in the direction to cause the output of the integration amplifier output terminal to be positive. This positive output is coupled to the base of a transistor 112 by means of the voltage divider consisting of resistors 114 and 116. Transistor 112 has its collector coupled to the source of positive power supply potential (+15 V) through a relay 118 which will be energized as long as transistor 112 remains conductive. The relay 118 is adapted, for example, to include a pair of contacts, not shown, which are coupled to the armature circuit, also not shown. In the event the field current in the field winding 10 goes to zero, the average voltage into the integrator will go to zero and at some predetermined level determined by the component values of the capacitor 102 and resistors 100, 114 and 116, transistor 112 will become non-conductive, the relay will drop out and the motor will become inoperative.

Figure 2:
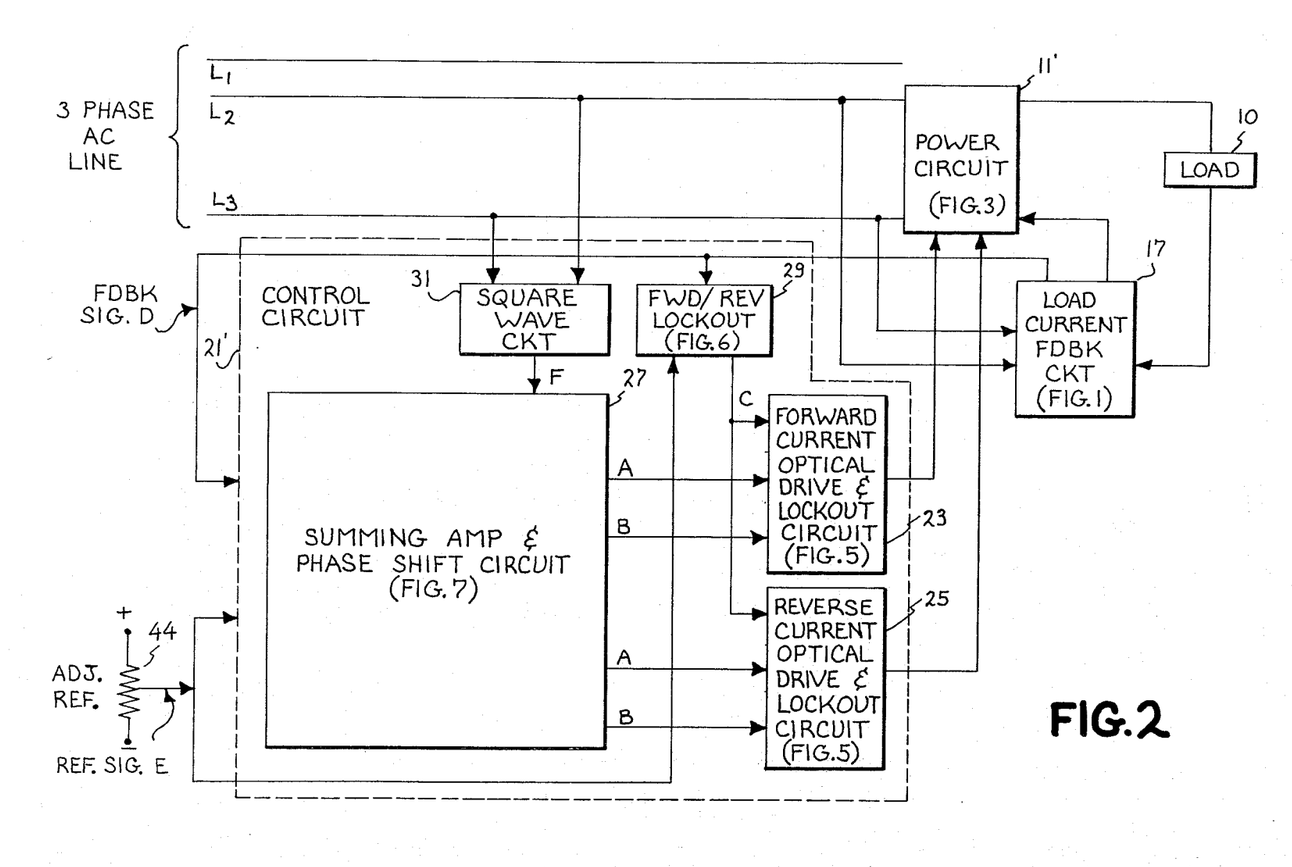
FIG. 2 is an electrical block diagram illustrative of a more complex half wave reversing type of field exciter according to the subject invention.

Up to this point what has been shown and described is an exciter for a DC field current of only one direction of motor rotation. And while the embodiment as shown in FIG. 1 is sufficient to broadly describe the subject invention it is normally desirable that one be able to regulate the current applied to a highly inductive load such as the motor field for both forward and reverse directions of motor operation. FIG. 2 discloses in block diagrammatic form the preferred embodiment of such an arrangement. The half-wave reversing field exciter shown therein includes a modified power circuit 11' coupled to a suitable source such as one phase of a three phase AC line including lines $L_1$, $L_2$ and $L_3$. In this embodiment, the power circuit 11' is coupled to lines $L_2$ and $L_3$ and is adapted to supply current to an inductive load 10 which may, as before, be the field winding of a DC motor. As in the earlier embodiment, a current feedback circuit 17, the details of which have already been described with reference to FIG. 1, is included for providing a signal proportional to the field current supplied and which is coupled to the signal summing point, not shown, where it is compared with a reference signal from the potentiometer 44.

Due to the fact that now both forward and reverse field currents are to be applied to the inductive load 10, a more complex control circuit 21' is required. As shown in FIG. 2, the control circuit 21' includes separate forward and reverse current optically coupled drive circuits 23 and 25 connected to the power circuit 11' and which respectively receive three control signals A, B and C from a summing amplifier and phase shift circuit 27 and a forward or reverse current lockout circuit 29. A line voltage squaring circuit 31 is utilized to synchronize operation of the circuitry 27 to the AC line voltage $L_2-L_3$. The operation of this control circuit will become evident as the following description proceeds.

Figure 3:
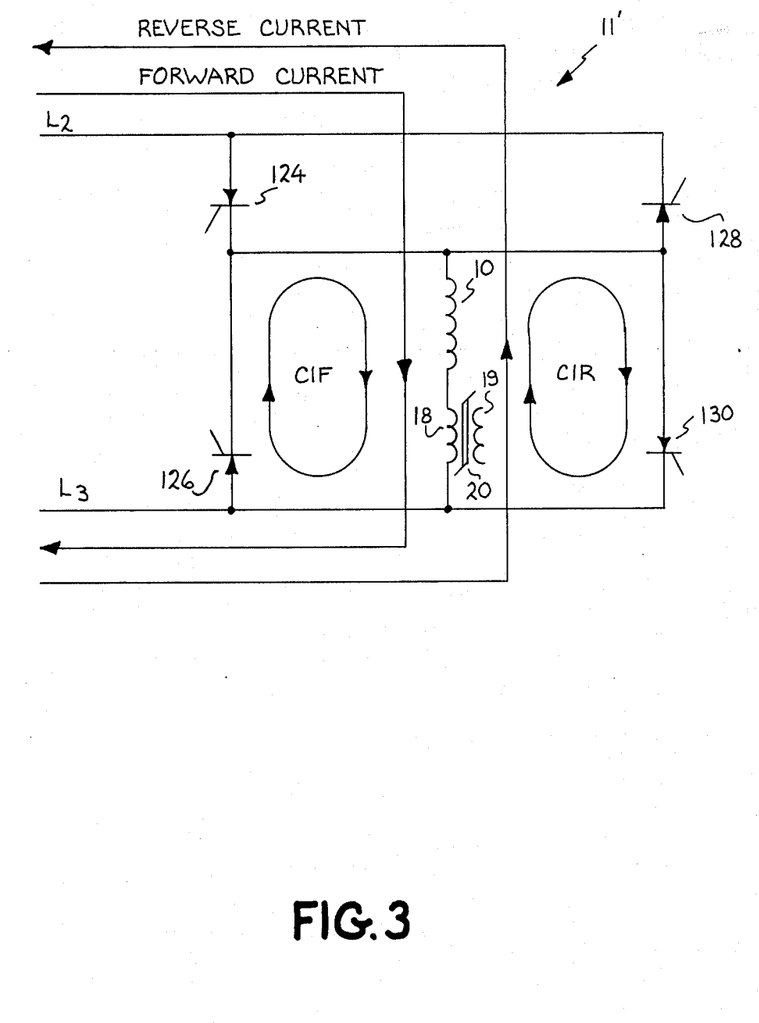
FIG. 3 is an electrical schematic diagram illustrative of the power circuit portion of the exciter shown in FIG. 2.

Considering these individual circuits now in detail, the power circuit 11' is shown in FIG. 3. This circuit includes two pairs of SCRs 124 and 126 and 128 and 130, one pair being used to supply forward current to the field winding load 10 and the other pair to supply current in the reverse direction. The forward pair of SCRs 124 and 126 are adapted to be rendered conductive in a manner to be described so that current flows through SCR 124 from the AC line $L_2$ into the load 10 and out line $L_3$ during one half cycle of the AC line voltage while SCR 126 circulates current (CIF) through the field winding 10 during the half cycle when SCR 124 is non-conductive. The reverse pair of SCRs 128 and 130 operate in a similar manner and, accordingly, SCR 128 is adapted to provide current flow from the line $L_3$ through the field winding 10 out line $L_2$ during one half cycle while SCR 130 is adapted to provide a circulating current (CIR) path during the next half cycle. Load or field current thus flows in only one SCR at any given time and within a pair of SCR current switches, between them on alternate half cycles of the line voltage. The pair carrying the current is dependent upon direction of power application to the load.

In order to assure that conduction in one pair of SCRs is stopped before current is allowed to begin conducting in the other, the lockout circuitry 29 shown in FIG. 2 is required. Lockout circuitry is required in any reversing control to prevent accidental short circuiting of the AC lines. One such short circuit path could occur from the line $L_2$ to line $L_3$ through SCR 124 and SCR 130 or from $L_3$ back to $L_2$ through SCR 126 and SCR 128. The lockout circuitry is integrally associated with the circuitry utilized to fire the SCRs 124, 126, 128 and 130 and will be considered in detail subsequently.

Figure 8:
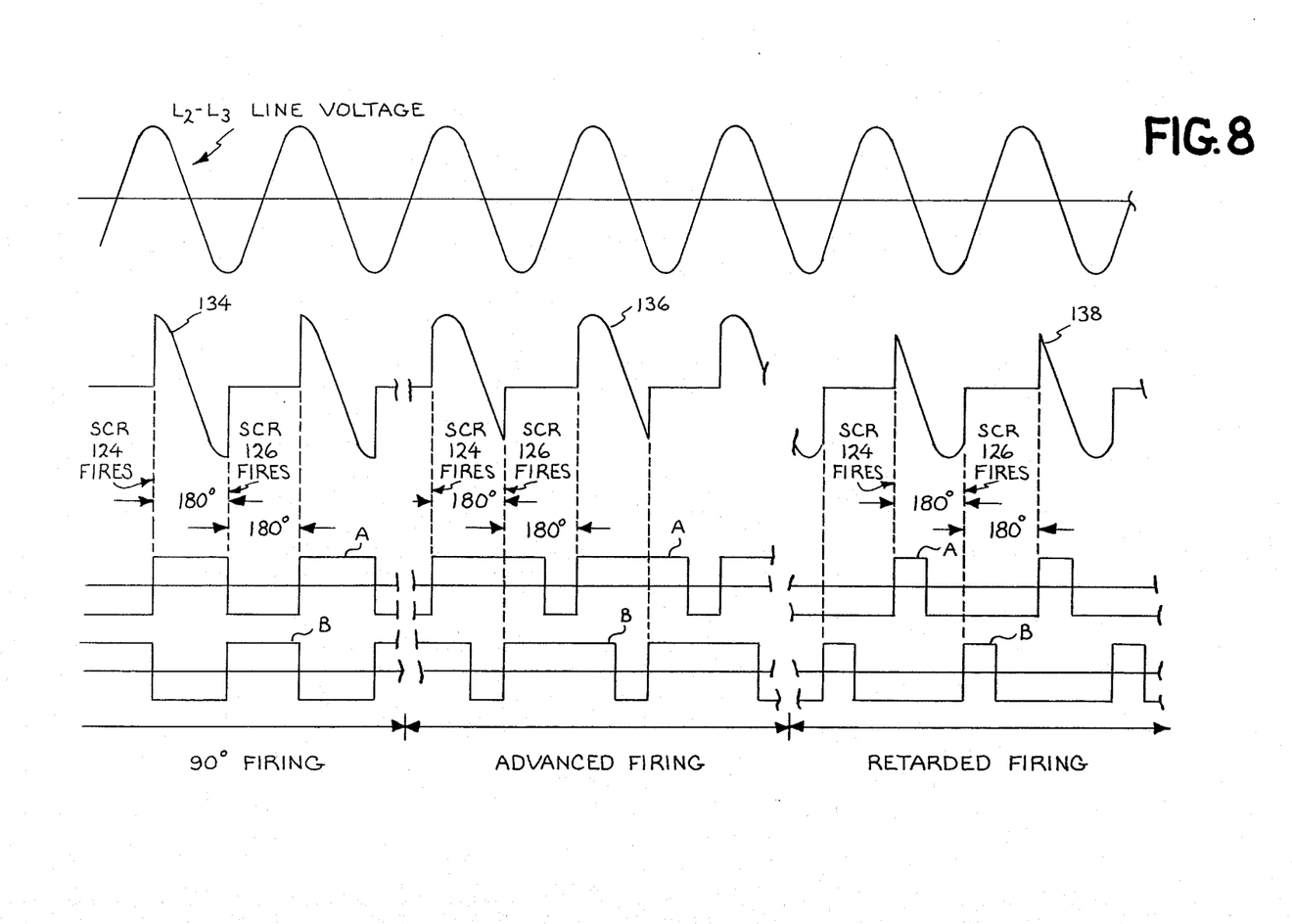
FIG. 8 is a set of waveforms illustrative of operation of the invention shown in FIG. 2 in a first or forward current direction through the load shown in FIG. 3.

It is to be noted that the SCRs 124 and 128 replace the half-wave rectifier diode 16 shown in FIG. 1 and are operated in the following manner. Considering the forward direction of current, i.e. current from $L_2$ to $L_3$, SCR 124 is made conductive at some point in the half cycle of AC line voltage when $L_2$ is positive with respect to $L_3$ and SCR 126 is made conducting at some point that is delayed by 180° from the start of conduction in SCR 124. Each of the SCRs 124 and 126 is made to conduct for period of 180° with the start of the 180° periods being initiated by the signals A and B from the circuit 21'. The start of conduction by SCR 124 (signal A) can be made to begin immediately after $L_2$ becomes positive with respect to $L_3$. 180° later signal B will cause SCR 126 to fire. After $L_2$ becomes negative with respect to $L_3$, the firing of SCR 124 must wait until line $L_2$ again becomes positive. The relationships between SCR phasing and output voltage for the forward current direction is shown in FIG. 8 for three conditions: 90° firing, less than 90° (advanced) firing; and greater than 90° (retarded) firing. Waveforms 134, 136 and 138 respectively illustrate the voltage across the field winding 10 for the three conditions mentioned. It can be seen, then, that if the start of conduction in SCR 124 is started before 90°, the average current and voltage at the field winding 10 will be positive. If, however, the start of conduction is delayed past the 90° point, the average output current will be positive while the average voltage will be negative.

Figure 9:
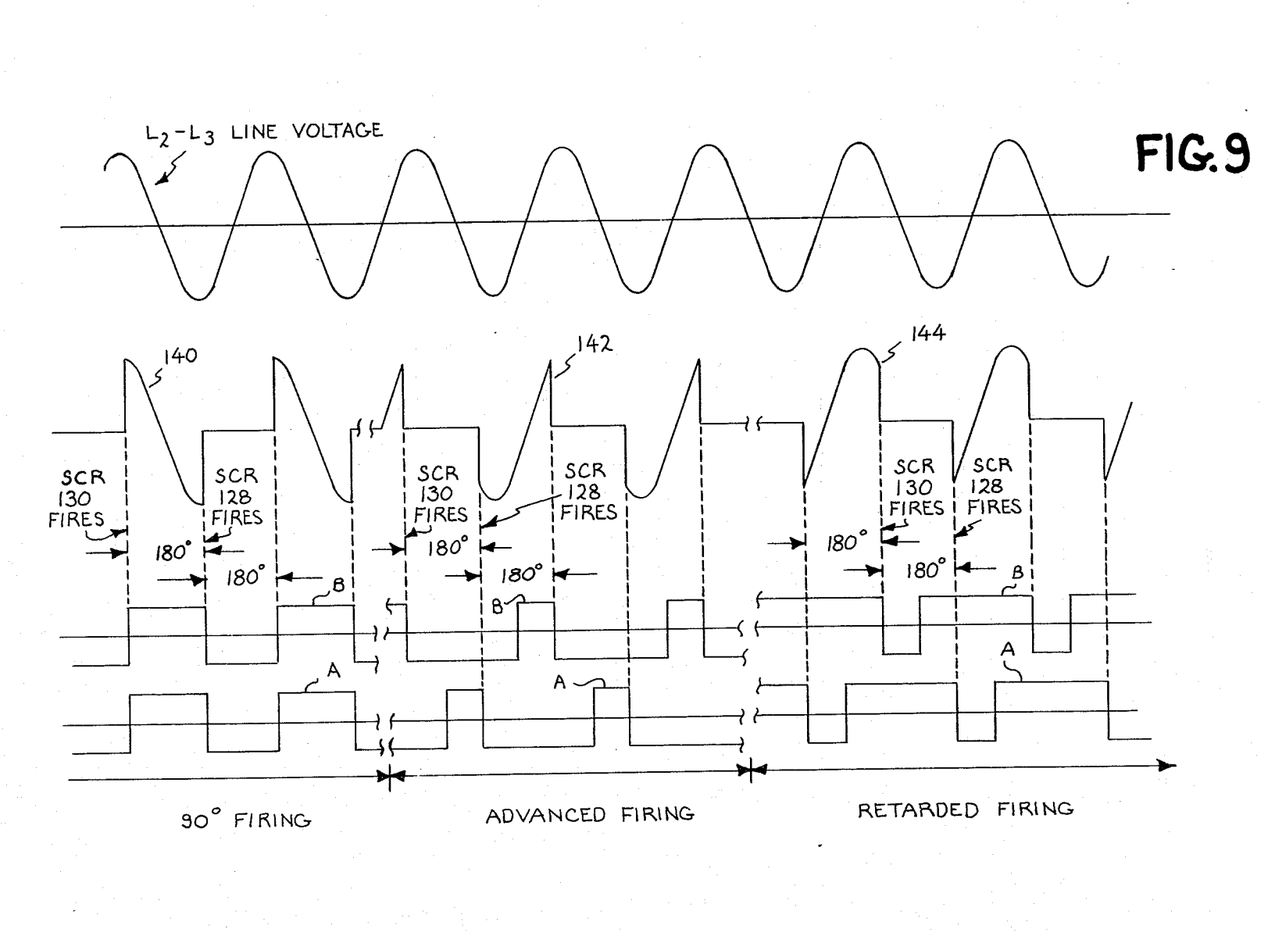
FIG. 9 is a set of waveforms illustrative of operation in a second or reverse current direction through the load shown in FIG. 3.

Conversely, for the negative or reverse direction of current, SCR 128 and SCR 130 are alternately made conducting in the same manner. This mode of operation is depicted by the waveforms of FIG. 9. Waveforms 140, 142 and 144 are respectively illustrative of the voltage across the field winding 10 when SCR 128 is fired at the negative 90° point of the line voltage $L_2-L_3$, firing of SCR 128 at less than 90° (advanced firing), and greater than 90° (retarded firing). It is seen that if the start of conduction of SCR 128 is delayed less than 90°, the average output current voltage at the load will be negative; however, if the start of conduction is delayed by more than 90° up to 180°, the average output current will be negative while the average voltage will be positive or zero.

From the preceding description, the power circuit 11' shown in FIG. 3 is able to operate in all four voltage-current quadrants, i.e. forward voltage rectifying, forward voltage inverting, negative voltage rectifying, and negative voltage inverting. "Inverting", as here employed, refers to the ability of the circuit to reverse the polarity of the circuit to reverse the polarity of the applied voltage, irrespective of the direction of the current itself, to thus effect a more rapid reduction in load current than would be otherwise possible.

The operation of the circuit of FIG. 3 is in contrast to known half-wave circuits that are commonly used to supply inductive loads and which use one SCR and one diode for current in one direction and switching contacts when bidirectional operation is desired. In such a circuit, current supplied to the load from the source is fed through the SCR while the diode is used for the circulating current path. This is a reversal of parts from that shown in FIG. 1. Further, in such prior art half-wave circuits, the use of a diode prevents negative voltage from being applied to the load when decreasing currents are called for. The resulting slower rate of current decrease means poorer overall performance. In addition, bidirectional current cannot be provided electronically but requires a reversing contactor or reversing switch along with discharge resistors, making the apparatus not only costly and bulky, but inconvenient to use.

In the embodiment shown in FIG. 1, the concept of optical gating of SCR 22 is disclosed for providing electrical isolation between the control circuit 21 and the power circuit 11. The reversing field exciter embodiment shown in FIG. 3 may also utilize this technique.

Figure 4:
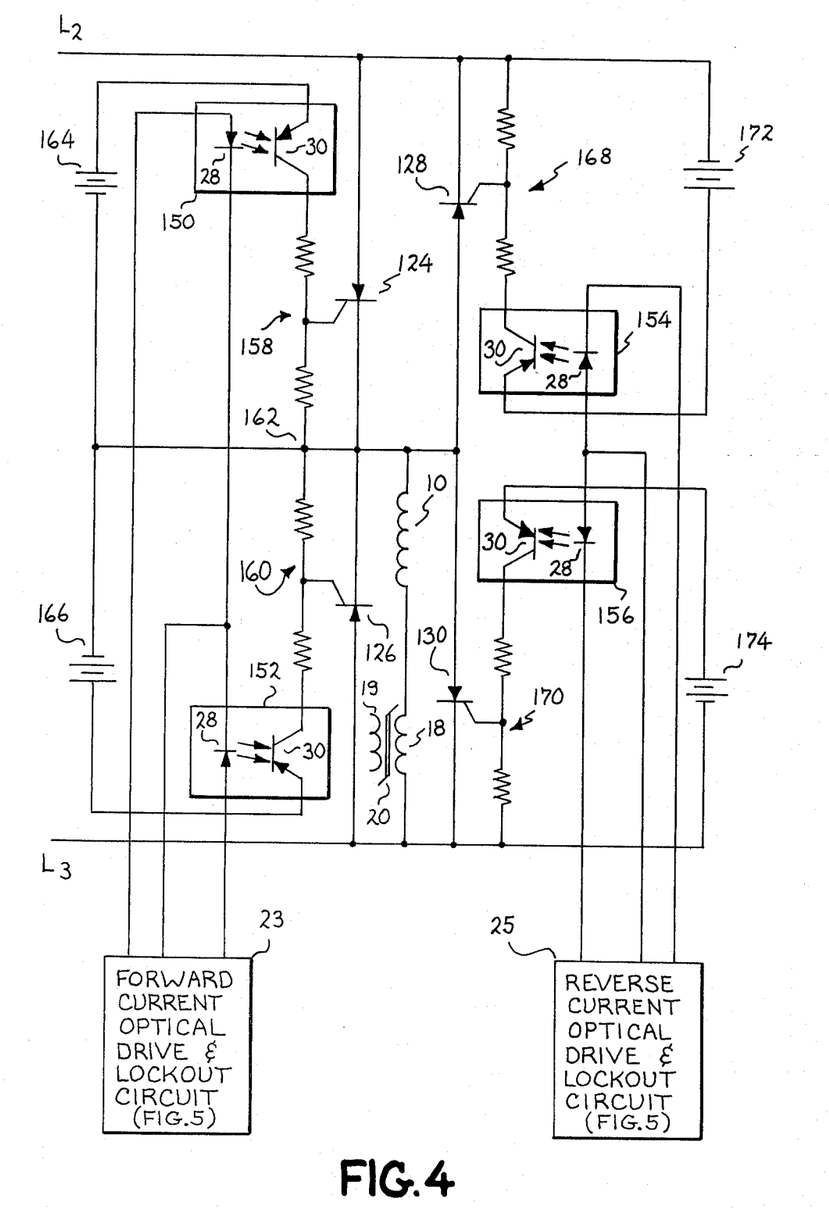
FIG. 4 is an electrical schematic diagram illustrative of an optical gating circuit arrangement for controlling the power circuit shown in FIG. 3.
Figure 5:
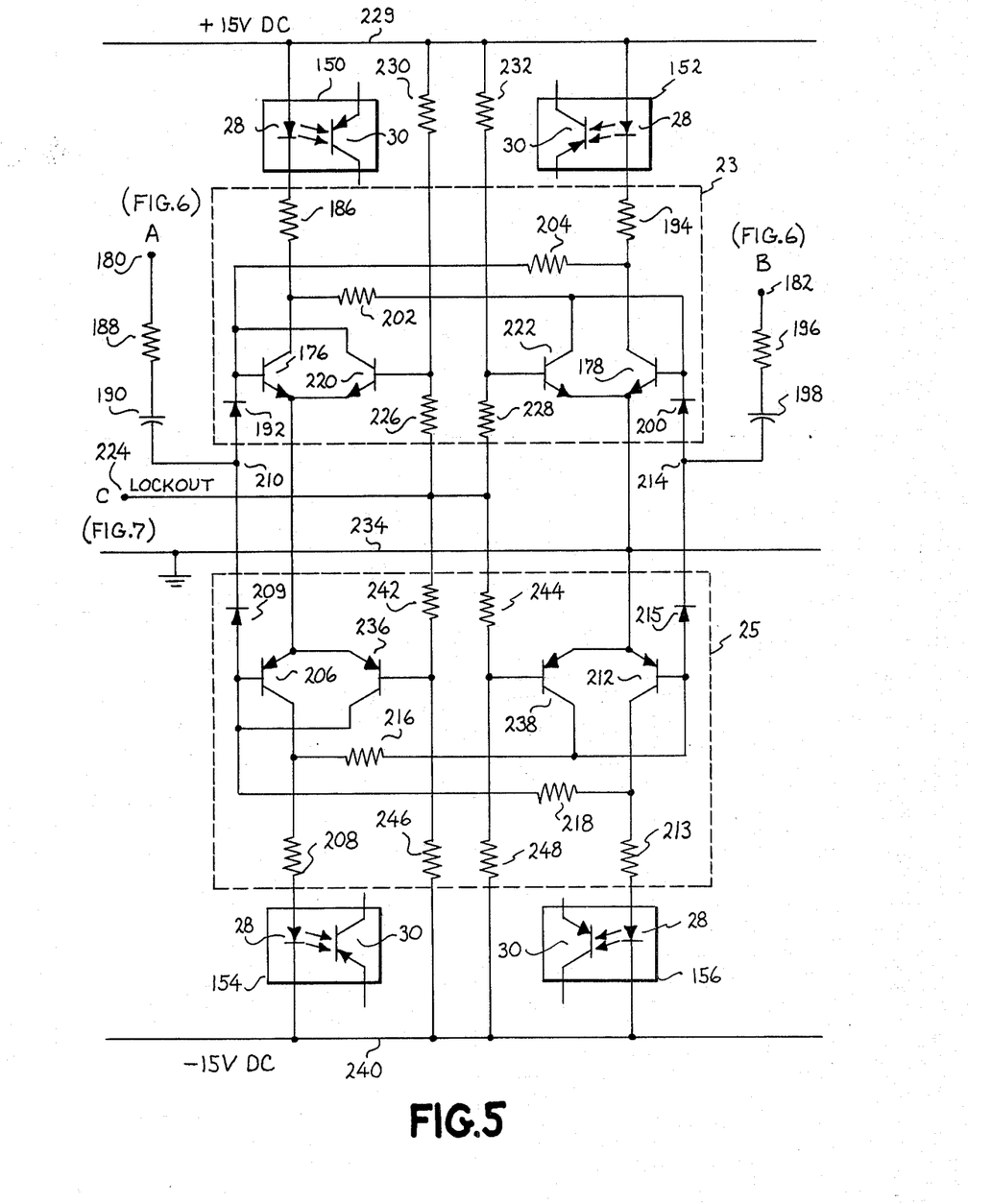
FIG. 5 is an electrical schematic diagram illustrative of drive and lockout circuitry for operating the optical gating circuitry shown in FIG. 4.

Referring now to FIG. 4, each SCR 124, 126, 128 and 130 is adapted to be fired by a respective photocoupler device 150, 152, 154 and 156 operated in accordance with either a forward current optical drive circuit 23, or a reverse current optical drive circuit 25, the details of which are shown in FIG. 5. The forward current direction SCR 124 is adapted to be triggered by means of photocoupler 150. In the like manner, the forward circulating current SCR 126 is adapted to be fired by means of photocoupler 152. For the reverse current directions, photocouplers 154 and 156 are respectively adapted to fire SCRs 128 and 130. In each instance, the photodiode 28 is coupled to the appropriate optical drive circuit 23 or 25, while the phototransistor 30 has its collector coupled to the gate of the respective SCR by means of a voltage divider. For the photocoupler 150, voltage divider 158 is coupled to the gate SCR 124 whereas voltage divider 160 couples the phototransistor 30 of photocoupler 152 to SCR 126.

In both instances the voltage dividers terminate at circuit junction 162 which is common to one side of the field winding 10. Bias potentials for the phototransistors 30 in the photocouplers 150 and 152 are further provided by means of voltage sources 164 and 166, respectively, coupled from the circuit junction 162 to the phototransistor emitters. With respect to the reverse current direction SCRs 128 and and 130, voltage dividers 168 and 170 couple respective phototransistors 30 of photocouplers 154 and 156 to the gate electrodes. In this instance, however, voltage divider 168 terminates in line $L_2$, whereas voltage divider 170 terminates in line $L_3$, while their opposite ends are connected to the respective collector electrodes of the respective phototransistors. The bias potentials for the phototransistors 30 and the photocouplers 154 and 156 are further provided by the voltage sources 172 and 174 connected from the respective emitter of the phototransistors 30 to lines $L_2$ and $L_3$.

Considering now the drive circuits 23 and 25, reference is made to FIG. 5. The circuitry shown therein is intended not only to illustrate the circuit means for energizing the photodiodes 28 in each of the photocouplers 150, 152, 154 and 156, but also the lockout circuitry therefor which was mentioned earlier as being required to prevent accidental short circuiting of the AC lines $L_2$ and $L_3$ during current reversal. The drive circuitry for the photocouplers 150 and 152 include transistors 176 and 178 which are adapted to be controlled by control signals A and B shown applied to terminals 180 and 182. These signals are generated by the circuitry shown in FIG. 6 and will be considered subsequently. Meanwhile it should be noted that the collector of transistor 176 is coupled to the photodiode 28 of the photocoupler 150 by means of a resistor 186. The control signal A is coupled to the base of transistor 176 by means of resistor 188, a coupling capacitor 190 and a signal directional diode 192. In a like manner, the collector of transistor 178 is connected to the photodiode 28 of photocoupler 152 by means of resistor 194 and the control signal B is adapted to be coupled to the base of transistor 178 by means of resistor 196, coupling capacitor 198 and a directional diode 200. It should also be noted that there is a resistor 202 connected from the collector of transistor 176 to the base of transistor 178 and a resistor 204 connected from the collector of transistor 178 back to the base of transistor 176. The resistors 202 and 204 provide cross coupling between the transistors 176 and 178, causing the circuit combination to be bi-stable, meaning that it is triggered into one of its stable states by positive going signal A applied to terminal 180 and into the other state by a positive going signal B applied to terminal 182. As shown in FIGS. 8 and 9, the signals A and B are square waves which have a fixed 180° relationship with respect to each other, but have an adjustable phase relationship with respect to the $L_2$—$L_3$ AC line voltage.

Similar drive circuitry 25 for the reverse current SCRs 128 and 130 (FIG. 4) triggered by the photocouplers 154 and 156 includes a transistor 206 coupled to the photocoupler 154 by means of resistor 208 and the signal A through the directional diode 209. Diode 209 connects to circuit junction 210 which is common to the coupler capacitor 190 and the aforementioned diode 192. The other drive transistor comprises transistor 212 which has its collector coupled to the photocoupler 156 by means of resistor 213, while its base is coupled to control signal B by means of directional diode 215. This diode connects back to circuit junction 214 which is common to the coupling capacitor 198 and the diode 200. As before, cross coupling resistors 216 and 218 couple the collectors and bases of transistors 206 and 212 to make the combination bi-stable as in the case for the forward current circuitry.

What remains to be considered with respect to FIG. 5 is the lockout circuitry. As shown for the forward current direction, the lockout circuitry includes transistors 220 and 222 connected around transistors 176 and 178, respectively. A lockout signal C is adapted to be coupled to terminal 224 which is coupled to the bases of transistors 220 and 222 by means of resistors 226 and 228. A positive bias potential applied to circuit bus 229 is further coupled to the bases by resistors 230 and 232. It should be noted that, for example, the emitter of transistor 220 is directly connected to the emitter of transistor 176; however, the collector of transistor 220 is connected to the base of transistor 176. A like connection exists between transistors 222 and 178. In operation, a positive going lockout signal C is adapted to turn on transistors 220 and 222 but since the emitters of transistors 176 and 220 are connected to a circuit bus 234 which is returned to ground, transistor 176 is prevented from becoming conductive. A similar situation exists with transistor 222 blocking the conduction of transistor 178. Thus, gating signals to the forward SCRs 124 and 126 (FIG. 4) are suppressed while those to the reverse current SCRs 128 and 130 are enabled.

Considering the reverse current direction lockout circuit, it consists of transistors 236 and 238 respectively connected across transistors 206 and 212 in a manner identical to the other lockout circuit with the exception that this reverse circuit is biased by a negative supply voltage applied to circuit bus 240. The lockout signal applied to terminal 224 is adapted to be coupled to the bases of transistors 236 and 238 via respective fixed resistors 242 and 244 with a negative bias voltage being connected thereto by means of resistors 246 and 248. A sufficiently negative lockout signal voltage C applied to terminal 224 is adapted to render transistors 236 and 238 conductive and thus suppress conduction of transistors 206 and 212 and accordingly the reverse SCRs 128 and 130. The biasing of the lockout circuitry is designed by selection of the components' values coupled to the bases of the lockout transistors 220, 222, 236 and 238, so that a deadband exists for gating both the forward current SCRs 124 and 126 and to the negative SCRs 128 and 130 meaning that firing is suppressed until a sufficiently positive or negative signal voltage C is applied to the lockout signal terminal 224.

Figure 6:
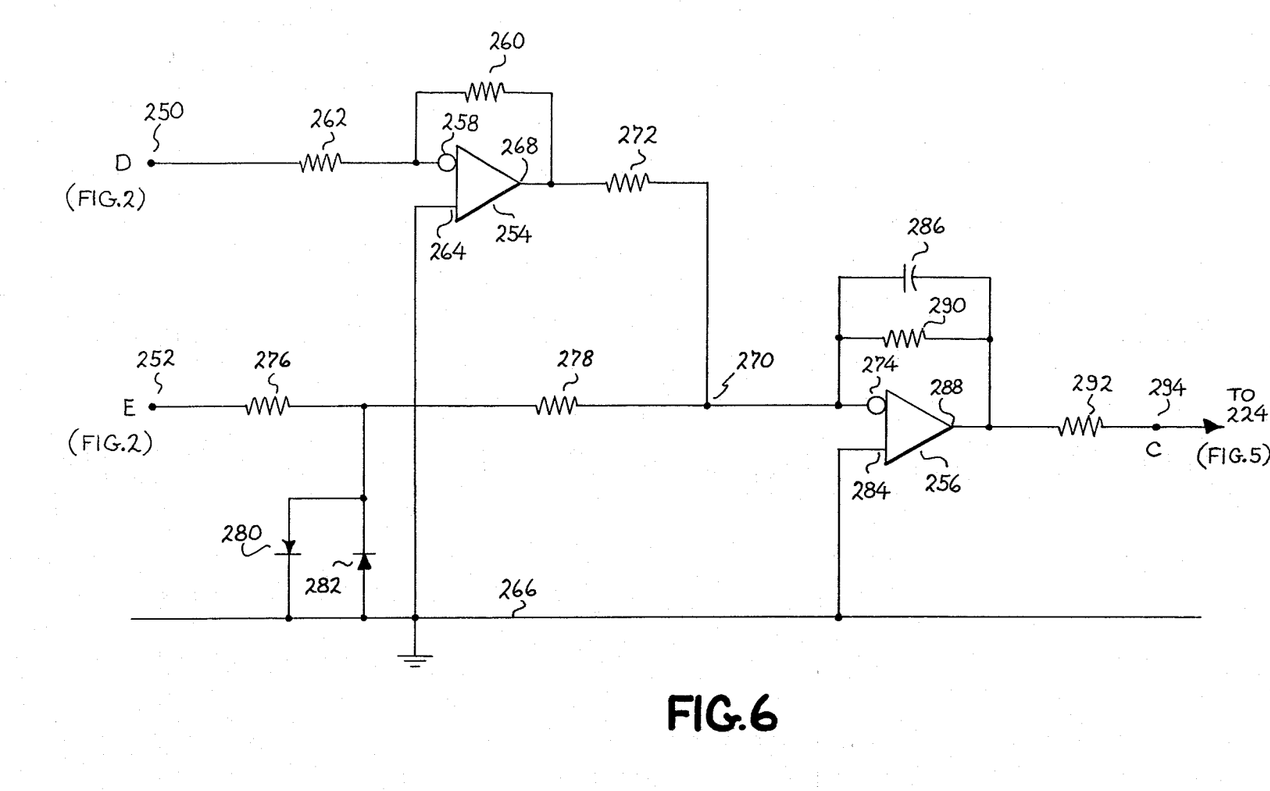
FIG. 6 is an electrical schematic diagram illustrative of circuit means for developing the lockout control signals for the circuitry shown in FIG. 5.

Circuitry for generating the lockout signal C is shown in FIG. 6 and includes input terminals 250 and 252 which are adapted to receive the current feedback signal D and current reference signal E, respectively, coupled thereto from the current feedback circuit 19 and the potentiometer 44 shown in FIG. 2. The circuit shown in FIG. 6 includes two operational amplifiers 254 and 256. The inverting input 258 of operational amplifier 254, which also has a feedback resistor 260, is coupled to the current feedback signal D input terminal 250 by means of resistor 262 while the non-inverting input 264 is returned to a circuit bus 266 which is at ground potential. The output 268 of operational amplifier 254 is connected to a circuit junction 270 via resistor 272. Circuit junction 270 is connected to the inverting input 274 of operational amplifier 256. The inverting input 274 is also connected back to the current reference signal E terminal 252 by means of the resistors 276 and 278. Intermediate the resistors 276 and 278 is a bipolar voltage clamp consisting of diodes 280 and 282 which have mutually opposite electrodes coupled to the ground bus 266. The non-inverting input 284 of operational amplifier 256 is also connected to the ground bus 266. An integrating capacitor 286 is connected from the amplifier output 288 back to the inverting input 274 together with a resistor 290. An output resistor 292 is connected between the amplifier output 288 and the lockout signal C ouput terminal 294 which is adapted to be connected to the C signal input terminal 224 shown in FIG. 5.

In operation, the lockout signal C at terminal 294 is essentially zero when both the current reference E and the feedback current signal D applied to terminals 252 and 250 are zero. This state causes suppression of gating signals to both the forward and reverse current pairs of SCRs 124 and 126 and 128 and 130. When the reference voltage from the potentiometer 44 is set to call for current in the forward direction, a reference signal E applied to terminal 253 is clamped by the diode clamp whereupon a fixed low level signal is coupled to the inverting input 274 of operational amplifier 256 via the resistor 278. The output 288 of operational amplifier 256 goes negative, and in so doing releases the suppression to the forward current SCRs 124 and 126 (FIG. 4) while maintaining suppression on the reverse current SCRs 128 and 130. As current builds up in a forward direction as a result of the action of the feedback circuit 19, the current feedback signal D applied to terminal 250 is fed into the operational amplifier 254. The output 268 from the operational amplifier 254 goes positive and accordingly reinforces the original small reference signal applied to inverting input terminal 274 of the integrating operational amplifier 256, causing the lockout circuitry to become latched in the proper direction to allow forward current conduction while preventing reverse current.

If the reference voltage E is then changed to call for a reverse direction current, the lockout circuit shown in FIG. 6 will remain latched in its original direction until the current from the output 288 reaches a very low value. A small delay is imposed by the input resistor 278 in combination with the integrator capacitor 286 as well as the value of the input resistor 262 to the operational amplifier 254. Accordingly, the current will decrease to zero and build up in the reverse direction thereby causing the voltage at output terminal 294 to change polarity. Suppression of the forward direction SCRs occurs while enablement of the reverse direction SCRs results.

Figure 7:
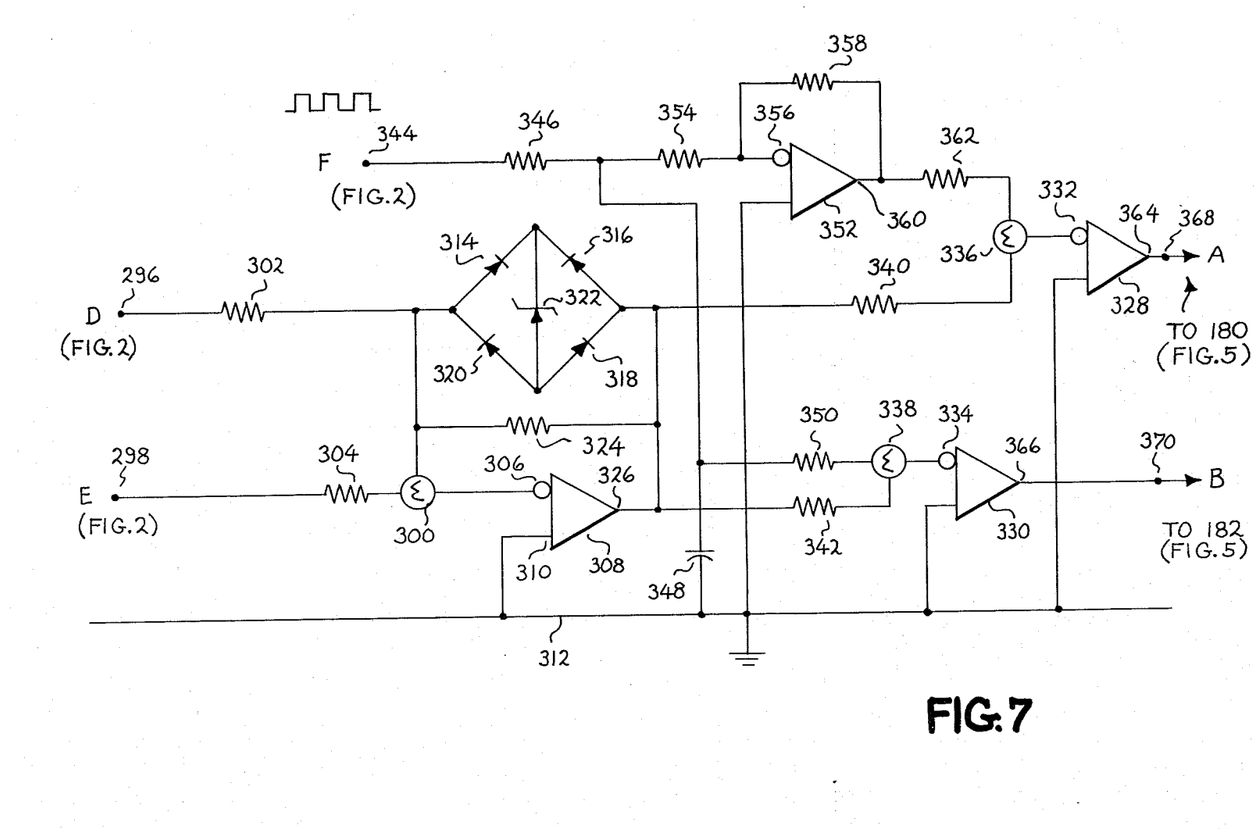
FIG. 7 is an electrical schematic diagram illustrative of the control circuitry for further controlling the optical gating circuitry shown in FIG. 5.

Turning attention to the means for generating the control signals A and B applied to the drive circuits 23 and 25 shown in FIG. 5, reference is now made to FIG. 7, wherein terminals 296 and 298 are adapted to have applied thereto, respectively, the current feedback signal D from the current feedback circuit 19 and the current reference signal E from the adjustable potentiometer 44, shown in FIG. 2. These signals are coupled to a summing junction 300 by means of the resistors 302 and 304. The summing junction 300 operates to provide a difference signal between the current feedback signal D and the reference signal E. This difference signal is applied to the inverting input 306 of an operational amplifier 308. Its non-inverting input 310 is connected to a ground circuit bus 312. A symmetrical signal limiter comprising the diodes 314, 316, 318, 320 and a Zener diode 322, all shunted by a resistor 324, is coupled between the output 326 and the summing junction 300 to limit the output of amplifier 308. With the exception of the current limiter, this circuitry corresponds to that shown in FIG. 1 which includes the operational amplifier 58, the summing junction 50 and the resistors 52 and 54.

In addition, the subject embodiment includes a pair of operational amplifiers 328 and 330 operated at high gain and which have their inverting inputs 332 and 334 connected to a pair of second summing junctions 336 and 338, respectively. The limited output from the summing operational amplifier 308 is coupled to summing junctions 336 and 338 by means, respectively, of resistors 340 and 342. The other signal applied to the second summing junctions 336 and 338 comprises a ramp voltage developed by means of the squaring circuit 31 shown in FIG. 2 and coupled to terminal 344. The square wave output signal F from the squaring circuit 31, synchronized with the sinusoidal line voltage $L_2$—$L_3$, is coupled to an RC network consisting of resistor 346 and capacitor 348 which comprise a well known passive integrator circuit. Accordingly, the voltage across the capacitor 348 provides a waveform in the form of a linearly ascending and descending ramp or sawtooth. This waveform is first coupled to summing junction 338 via resistor 350. A signal inverter circuit, however, is coupled between the capacitor 348 and the summing junction 336. The inverter comprises an operational amplifier 352 having an input resistor 354 coupled to the inverting input 356. A feedback resistor 358 is coupled from the output 360 to the input 356. A summing resistor 362 couples the output 360 to the summing junction 336.

Ramp or sawtooth voltages of mutually opposite polarities accordingly are applied to the respective summing junctions 336 and 338 along with the limited voltage output of the first summing amplifier 308. The operational amplifiers 328 and 330, being operated as high gain devices, provide square wave output signals A and B of mutually opposite polarity at the outputs 364 and 366 and, accordingly, output terminals 368 and 370. The signals A and B switch polarity at the points where the summed signals applied to inputs to amplifiers 328 and 330 go through zero. These crossover points, moreover, shift back and forth in phase relative to the sinusoidal $L_2$—$L_3$ line voltage as a function of the output of operational amplifier 308 which is coupled to the first summing junction 300, which, as noted above, has applied thereto signals corresponding to the current feedback signal D and the current reference signal E. The mutual phase relationships between the square wave output signals from operational amplifiers 328 and 330 which comprise the control signals A and B, respectively, as noted earlier, are shown in FIGS. 8 and 9 for both forward current and reverse current operational modes.

It should be pointed out that the limits between the advanced and retarded firing points of the SCRs 124, 126 and 128, 130, referred to as the maximum phase back angle, is determined by the ratio of the amplitude of the ramp or sawtooth signal across the capacitor 348 and the limited output signal from the operational amplifier 308. Variation of the phase back limit is possible by changing the size of the ramp signal applied to summing junctions 336 and 338. In the present embodiment, these amplitudes are shown to be fixed at a predetermined amplitude but can be made variable when desired.

The control waveforms A and B, moreover, provide continuous gating of the SCRs 124, 126 and 128, 130 during the period when they are supposed to be conducting due to the square wave characteristics of the signals A and B. This is in contrast to pulse gating or pulse train gating. The continuous gating technique employed herein assures SCR conduction through periods when there may be "notches" in the AC line voltage.

Figure 10:
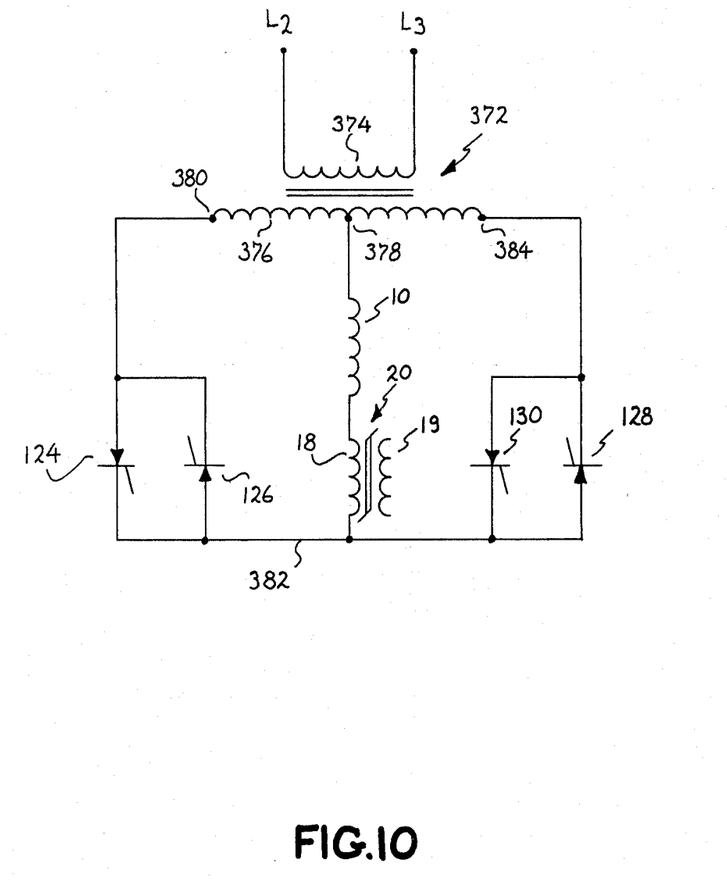
FIG. 10 is an electrical schematic diagram illustrative of a power circuit adapted for full-wave operation.

While the present invention has been considered thus far as being a half-wave field exciter for both unidirectional and bidirectional load currents, full-wave reversing operation can be obtained, when desirable, by a modification of the power circuit 11' shown in FIG. 3 to the circuit shown in FIG. 10. The control circuitry 21' (FIG. 2) remains the same; however, for full-wave operation an additional center tapped transformer 372 is required wherein the primary winding 374 is connected across one phase of the AC power line, for example $L_2$ and $L_3$, while a secondary winding 376 including a center tap 378 is connected to the load 10 which is in series with the primary winding 18 of the saturable core transformer 20. Whereas the forward current SCRs 124 and 126 were coupled in front-to-back relationship in series across the lines $L_2$ and $L_3$ for the half wave operation, in a full-wave system as shown in FIG. 10, the SCRs 124 and 126 are coupled in parallel in mutually opposite polarity relationship between one end terminal 380 of the secondary winding 376 and a common circuit bus 382. For the reverse current condition, the SCRs 128 and 130 are connected in mutually opposite polarity relationship between the opposite end terminal 384 of the secondary winding 352 and the common circuit bus 382. A current return path is provided for both halves of the secondary winding by the common circuit bus 382.

Thus what has been shown and described is a continuously adjustable voltage rectifier circuit having a desired control circuit to power circuit isolation which is adapted to supply a regulated output current to a highly inductive load such as the field winding of an electric motor. While acting as an exciter for the field winding of an electric motor is the primary use made of the subject invention, it can also be utilized in connection with loads such as the armature of a DC motor or even a simple resistive load.

While there has been shown and described what are at present considered to be the preferred embodiments of the present invention, modifications thereto will readily occur to those skilled in the art. It is not desired, therefore, that the invention be limited to the specific arrangements shown and described, but it is intended to cover all such modifications and alterations which fall into the true spirit and scope of the invention as defined in the appended claims.

What I claim is:

1. A control circuit for supplying electrical power from an alternating current source to the field winding of an electric motor comprising:
   (a) means including a controlled input current path to intermittently connect said winding to said source;
   (b) a controlled freewheeling path for carrying field current for a predetermined portion of a period during which the field winding is not connected to said source;
   (c) means to sense the value of the actual field current and to provide a first output signal which is a function of said actual field current;
   (d) means to provide a second output signal which is a function of the desired field current;
   (e) means to combine said first and second output signals and produce a control signal which is a function of the difference between said first and second output signals; and
   (f) means to provide coordinated control of said input current path and said freewheeling path in response to said control signal to thereby insure continuous current through said field winding and to make both forward and reverse current-forcing voltages selectively available at said field winding.

2. The control circuit as defined by claim 1 wherein said freewheeling path includes controlled rectifier means rendered conductive in response to said difference signal.

3. The control circuit as defined by claim 2 wherein said input current path includes a controlled rectifier means coupled between said field winding and said source for supplying intermittent power to said field winding; and
   wherein said means to produce a control signal is adapted to render both controlled rectifier means alternately conductive in response to said difference signal.

4. The control circuit as defined by claim 2 wherein said means for sensing the value of said actual field current comprises a saturable core transformer having a primary and secondary winding, said primary winding being coupled intermediate said field winding and said controlled rectifier in said controlled freewheeling path and wherein said secondary winding is coupled to said means to combine said first and second output signals and is adapted to supply said first output signal to said controlled rectifier.

5. The control circuit as defined by claim 4 wherein said means for controlling includes photo-optic signal coupler means coupled to both controlled rectifier means.

6. A circuit for controlling the electrical power applied to an inductive load from an alternating current (AC) source comprising:
   (a) a power circuit including a first pair of controlled rectifier means coupled intermediate said source and said load and adapted to permit current through said load in a first direction, one of said controlled rectifier means of said first pair permitting intermittent current from said source to said load and the other controlled rectifier means of said first pair permitting a circulating current path for load current during periods when current is not provided from said AC source, and a second pair of controlled rectifier means coupled intermediate said AC source and said load and being adapted to permit current through said load in a second direction, one controlled rectifier means of said second pair permitting intermittent current flow from said AC source to said load and the other controlled rectifier means of said second pair permitting a circulating current path for a load current during periods when flow is not permitted from said AC source to said load;
   (b) circuit means coupled to said load providing a first signal proportional to the load current;
   (c) circuit means providing a second signal indicative of a desired current direction and proportional to the desired load current;
   (d) circuit means for combining said first and second signals and providing an error signal; and
   (e) a control circuit including means coupled to said first and second pairs of controlled rectifier means and being responsive to said error signal to cause said first pair of controlled rectifier means to become alternately conducting for respective 180° periods beginning at predetermined points with respect to the AC source voltage in response to the magnitude and polarity of said error signal and to cause said second pair of controlled rectifier means to become alternately conducting for respective 180° periods beginning at predetermined points with respect to the source voltage in response to the magnitude and opposite polarity of said error signal whereby forward and reverse current-forcing voltages are made selectively available at said load.

7. The circuit as defined by claim 6 wherein said means of said control circuit includes photo-optic coupler means coupled to said first and second pair of controlled rectifier means for selectively rendering each controlled rectifier means conductive for prescribed 180° periods.

8. The circuit as defined by claim 7 wherein said means of said control circuit means includes drive circuit means for selectively operating said photo-optic coupler means in response to said error signal.

9. The circuit as defined by claim 8 and additionally including lockout circuit means coupled to said drive circuit means for inhibiting operation of said second pair of controlled rectifier means for load current of said first direction and inhibiting operation of said first pair of controlled rectifiers for load currents of said second direction and thus prevent any possible short circuit across said AC source particularly during direction reversal of said load current.

10. The circuit as defined by claim 6 wherein said first and second pairs of controlled rectifiers are respectively connected in series opposition across said AC source.

11. The circuit as defined by claim 6 and additionally including a transformer having a primary winding and a secondary winding including a center tap, wherein said primary winding is connected to said AC source, and said load is connected to said center tap, wherein said first pair of controlled rectifiers is coupled in mutually oppositely poled parallel relationship across one end of said secondary winding and said second pair of controlled rectifiers is coupled in mutually oppositely poled parallel relationship to the opposite end of said secondary winding, and a common circuit lead couples said two pairs of controlled rectifiers to said load.

12. The circuit as defined by claim 11 wherein said circuit means providing said first signal is coupled intermediate said load and said last recited common circuit lead.

13. The circuit as defined by claim 12 wherein said circuit means providing said first signal includes means to isolate said power circuit from said load circuit.

14. The circuit as defined by claim 13 wherein said isolating means includes a saturable core transformer having primary and secondary windings and wherein said primary winding is coupled to said load and said secondary winding is coupled to said control circuit means.

* * * * *